Sept. 3, 1957  E. F. BORON ET AL  2,805,270
ELECTRODE HOLDER CONSTRUCTION
Filed Oct. 19, 1955  2 Sheets-Sheet 2

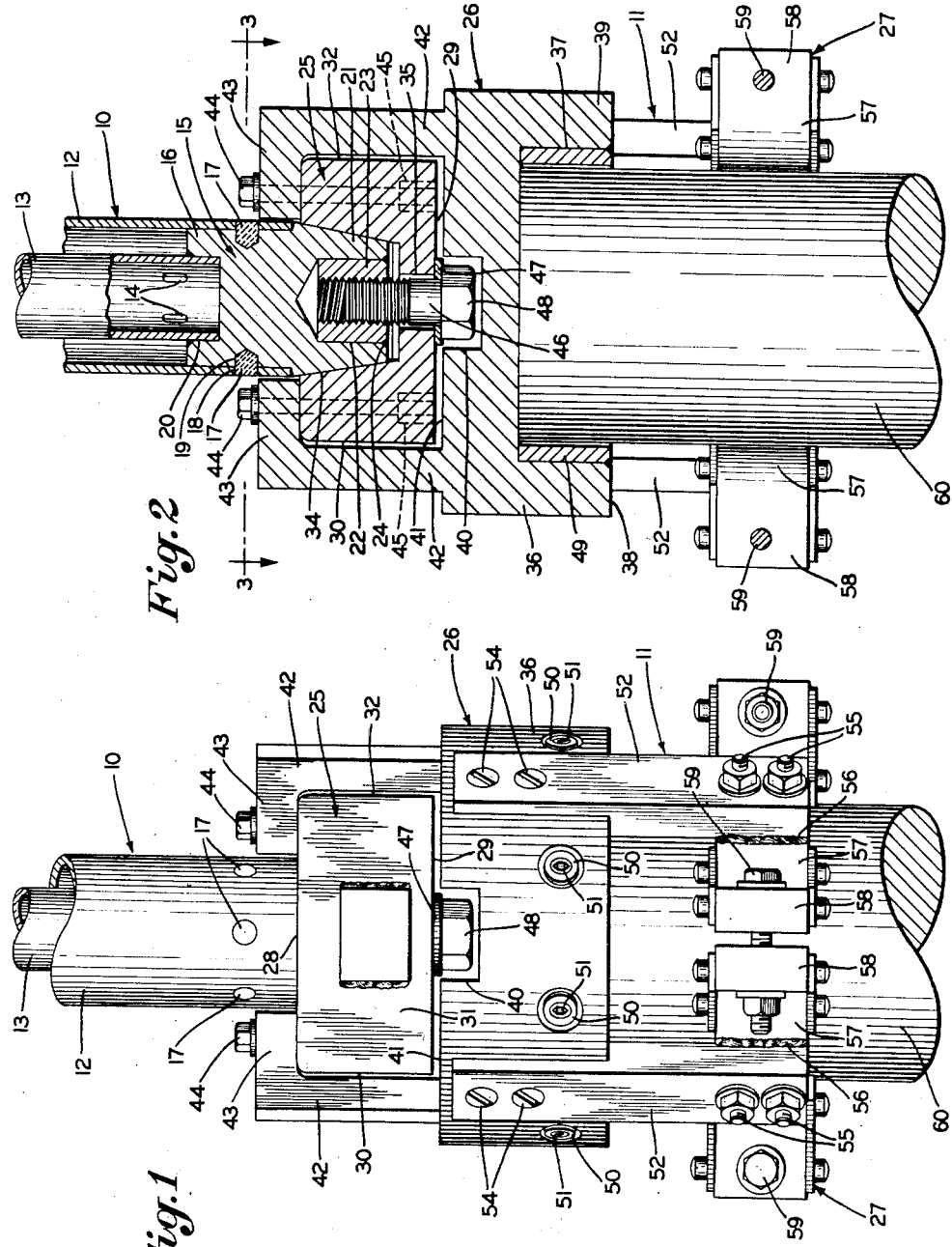

INVENTORS
Eugene F. Boron,
Earl William Yost,
Richard M. Scriver a
BY William H. Gorga nd Frease & Bishop
ATTORNEYS

United States Patent Office 2,805,270
Patented Sept. 3, 1957

2,805,270
ELECTRODE HOLDER CONSTRUCTION

Eugene F. Boron, Niles, Earl William Yost, Youngstown, Richard M. Scriver, North Jackson, and William H. Gorga, Warren, Ohio, assignors to Mallory-Sharon Titanium Corporation, Niles, Ohio, a corporation of Delaware Application October 19, 1955, Serial No. 541,362

11 Claims. (Cl. 13—15)

The invention relates to electrode support construction and more particularly to an electrode holder construction for use with consumable electrodes of considerable size and weight, such as relatively large and heavy titanium electrodes which are supported by the holder in position for feeding vertically into a consumable electrode arc furnace.

The manufacture of products from titanium or titanium alloys requires the production of titanium or titanium alloy sheet or strip or bar or rod material which in turn must be rolled or forged from ingots or billets.

It is desirable from many standpoints that such ingots be as large as possible not only in diameter or cross-sectional area, but in mass or weight. One procedure by which sound titanium or titanium alloy ingots may be produced involves the melting of a consumable electrode of the desired analysis in an arc furnace to form an ingot of substantially greater cross-sectional area than the cross-sectional area of the electrode consumed; and then to utilize such ingots as an electrode, by securing a number of the same together end to end, and remelting the same in another consumable electrode arc furnace to produce the final desired ingot of increased cross-section and size.

The electrodes for the initial melting operation may be formed of a series of compressed bars of titanium sponge welded together side by side and end to end, the same normally having a rectangular or square cross-section. The intermediate ingots formed from the first melting operation may be round so that the consumable electrode formed by securing several of the same together end to end may have a round cross-section. Alternately, any of such consumable electrodes may be formed of scrap titanium of known analysis consolidated in some manner to provide a current-conducting bar.

In the operation of a consumable electrode arc furnace for melting titanium or titanium alloys, the electrode is clamped and supported in a vertical position by means of an electrode holder. The electrode holder and therefore the electrode are then lowered vertically into the furnace at a steady rate determined by the speed at which the electrode is being arc melted, with the molten metal flowing into and solidifying in a mold positioned in the lower portion of the furnace.

Certain problems are encountered, however, in the design and construction of an electrode holder for such a use. One problem is that the electrode holder must be provided with cooling means, since the electrode and the electrode holder must be lowered into extremely high temperature zones in the furnace, particularly as the portion nearest the electrode holder is consumed. Moreover, the melting chamber of such an arc furnace is provided with a controlled, usually argon, atmosphere to prevent oxidation of titanium during melting and cooling.

Thus, the electrode holder is exposed to a great amount of heat.

A further problem is that the electrode holder, including both the supporting and clamping portions thereof, must be formed of a material which will readily conduct electricity, since electricity must be conducted to and through the electrode during the entire melting operation. Such materials usually have a relatively low strength, for instance, copper, but yet the electrode holder must be constructed so that it will support an electrode of considerable size and weight without failure at high temperature.

A still further requirement of the electrode holder is that the clamping means thereof should be readily detachable from the support and cooling portions in order to enable the electrode clamping means to be secured to the electrode at a location remote from the furnace. This latter requirement arises because of the practical difficulty of securing the clamping means to the electrode while both are suspended above a furnace which can be sealed readily for maintaining the controlled atmosphere therein. However, when the clamping means is properly secured to the electrode at a convenient work station so as to obtain the desired supporting and current-conducting connection therebetween, such clamping means may be readily engaged while suspended above a furnace laterally with the support and cooling portion of the electrode holder.

Finally, another requirement is that, although the clamping and supporting portions of the electrode holder must be readily detachable from each other, when connected, they must form a unit of sufficient strength to support a relatively large and heavy electrode. Also, the connector or coupling must be one which may be quickly and conveniently connected or disconnected.

Certain prior electrode holder constructions have supported the clamping portion thereof through a threaded connection with copper cooling and supporting pipes. Such threaded connection does not, however, provide the desired strength for supporting a relatively large electrode, due to the relatively low strength of copper and the fact that the entire weight of the electrode must be carried by the threads.

In our copending application, Serial No. 515,614, filed June 15, 1955, we proposed an electrode holder construction intended to overcome the above-stated difficulties and problems of prior construction and to meet the necessary requirements of cooling, strength and detachability.

Such proposal however has not proven completely satisfactory because of the fact that the construction included a threaded connection with copper cooling and supporting pipes, and while it was intended that a considerable portion of the weight be supported by a fastening screw, at least a portion of the load was carried by said threaded pipe connection.

Also, in that construction the fastening screw was threaded into a copper plug attached to the copper cooling and supporting pipes, whereby the entire weight of the electrode and clamping means was necessarily carried by copper threaded connections.

Furthermore, in our prior application above referred to, in order to disconnect the clamping portion from the supporting portion, it was necessary to remove a multiplicity of bolts and to then slide the clamping portion laterally relative to the supporting portion. And, in order to disconnect the engagement member or adaptor from the supporting portion, it was necessary to also remove the fastening screw and then unscrew the adaptor from the threaded copper tube.

It is, therefore, a primary object of the present invention to provide an electrode support construction for supporting an electrode in vertical position which overcomes the above-stated difficulties and problems of prior constructions and meets the necessary requirements of cooling, strength and detachability.

Another object is to provide an electrode support construction of the character referred to in which the cooling pipes, which form the supporting portion, have no threaded connection to the clamping portion.

A further object is to provide such an electrode support construction in which a copper plug is rigidly attached to the cooling tubes and is received in a socket in a copper attaching member or adaptor, the sole purpose of the plug and the adaptor being the transmission of electric current from the tubes to the electrode.

A still further object is to provide an electrode support construction in which the copper plug is tapered and the socket in the copper adaptor is correspondingly tapered so as to assure a tight electrical connection therebetween.

Another object of the invention is to provide an electrode support construction of the character referred to in which the clamping portion is detachably secured to the supporting portion by means which transmit the entire load of the electrode directly to the supporting pipes independent of any copper thread connection.

A further object is to provide such an electrode support construction in which the clamping portion is detachably secured to the supporting portion by a single fastening screw.

A still further object is to provide an electrode support construction of this character in which the fastening screw is formed of stainless steel and is threaded into a steel insert in the copper plug, whereby the entire load of the electrode is transmitted directly to the steel screw and insert.

It is also an object to provide such an electrode support construction which may be formed entirely of relatively low strength material having high current conductivity with the exception of the steel screw and insert.

Finally, it is an object of the invention to provide an electrode support construction for supporting an electrode in vertical position in an arc furnace, which satisfies all of the above objects in a simple, efficient and relatively inexpensive manner.

These and other objects apparent to those skilled in the art and from the following disclosure, or which may be later referred to, may be attained by the parts, constructions, arrangements, combinations and subcombinations comprising the present invention, the nature of which is set forth in the following general statement, a preferred embodiment of which—illustrative of the best mode in which applicants have contemplated applying the principles—are set forth in the following description and illustrated in the accompanying drawings, and which are particularly and distinctly pointed out and set forth in the appended claims forming a part hereof.

In general terms, the electrode support construction comprising the present invention for supporting an electrode in vertical position in an arc furnace may be stated as including a supporting portion and a clamping portion mounted on said supporting portion. The supporting portion is detachably engaged with a clamping portion engagement member and held in electrical conducting contact therewith by fastening means directly connecting said engagement member to the supporting portion and transmitting all of the load therebetween.

More specifically, the supporting portion may comprise generally vertically disposed cooling and supporting pipe means having a tapered plug of copper, or other material of high electrical conductivity, securely attached to the lower end thereof as by welding or the like. An internally threaded insert of stainless steel or the like is welded or otherwise secured within the lower end ortion of the plug.

The clamping portion includes an engagement member or adaptor of copper or other material of relatively high electrical conductivity, provided in its upper side with a tapered socket shaped to receive the tapered plug in tightly fitting contact for the transmission of electric current from the supporting pipes to the electrode supported in the clamping portion.

A central opening is formed in the engagement member or adaptor, communicating with the lower end of the socket therein, and a fastening screw, of stainless steel or the like, is located through said opening and screwed into the insert in the plug, drawing the tapered sides of the plug into tight electrical contact with the tapered side walls of the socket in the adaptor. This steel fastening screw and steel insert form the only attaching means between the clamping portion and the supporting portion and transmit the entire load of the clamping portion and the electrode supported thereby to the supporting pipe means.

The calmping portion includes clamping means mounted on the engagement member or adaptor. This clamping means may be detachably mounted on the engagement member if desired, although for the purpose of the present invention this detachable mounting is not necessary. Furthermore, so far as the present invention is concerned, the clampig means may be such as disclosed in our prior application above referred to, or may be of any conventional type of clamping means.

By way of example, a preferred embodiment of the improved electrode supporting means, showing the best mode in which applicants have contemplated practicing the invention, is illustrated in the accompanying drawings forming a part hereof, wherein like reference characters indicate similar parts throughout the several views, and in which;

Fig. 1 is a side elevation of the new electrode supporting structure showing an electrode clamped and supported therein;

Fig. 2 is a vertical sectional view through the electrode supporting structure shown in Fig. 1, taken as on the line 2—2, Fig. 3;

Referring now more particularly to the construction illustrated, the electrode support construction comprising the invention includes essentially a supporting portion indicated generally at 10 and a clamping portion indicated generally at 11. With the exception of certain relatively small parts as will be hereinafter described, the parts making up the supporting portion and the clamping portion are all formed of copper or other suitable metal which will readily conduct electricity.

The supporting portion 10 includes the vertically disposed cooling and supporting pipes 12 and 13, which extend upwardly and are closed at their upper ends and supported by a suitable yoke or the like (not shown) which may be controlled by any suitable and well known means for lowering the electrode support so that a titanium electrode or the like supported therein may be lowered at the proper rate, as into a consumable electrode arc furnace for the manufacture of titanium ingots or the like.

Figure 4:
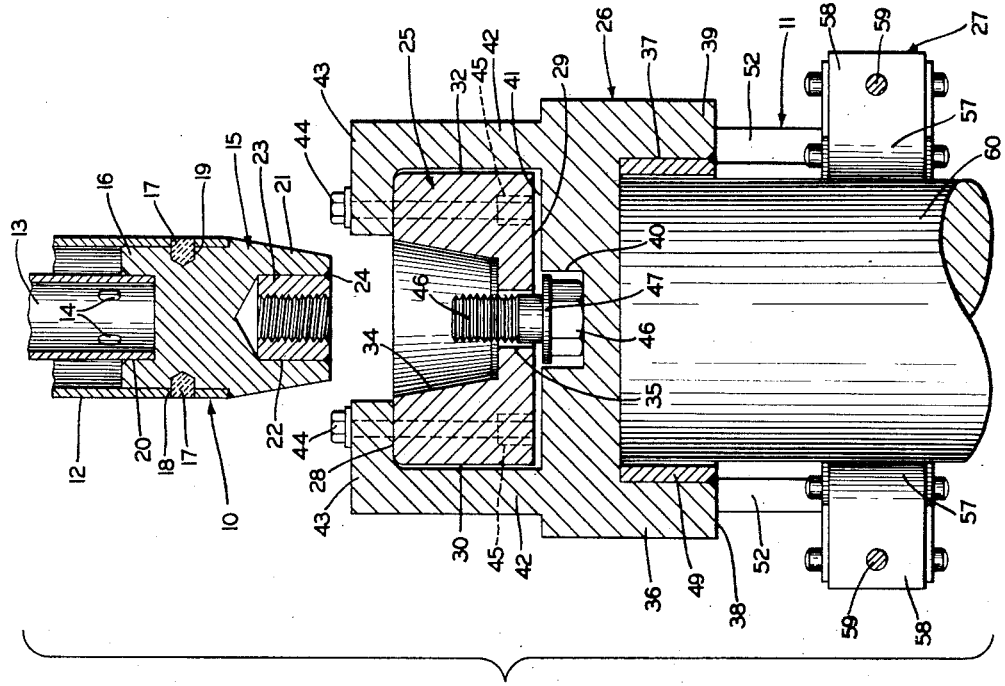
Fig. 4 is a vertical sectional view similar to Fig. 2, showing the fastening screw removed and the clamping portion separated from the supporting portion.
Figure 3:
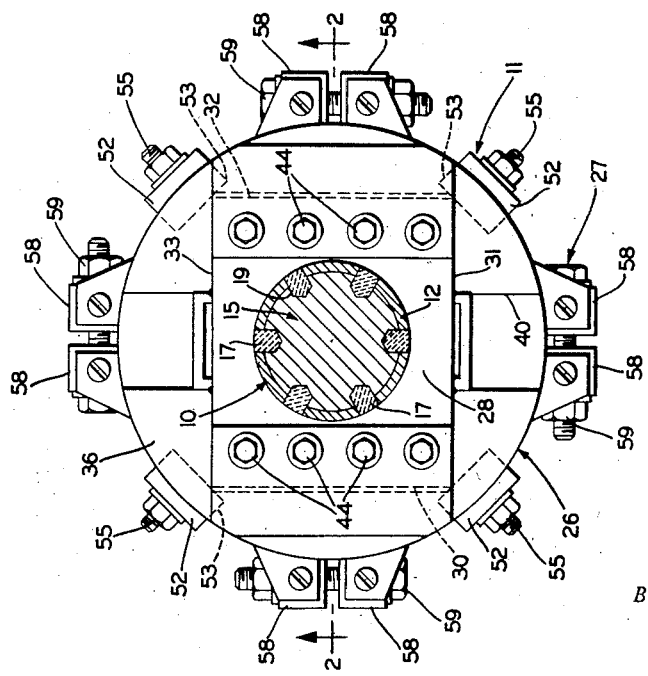
Fig. 3 is a plan sectional view, taken as on the line 3—3, Fig. 2.

The smaller diameter pipe 13 is located concentrically within and substantially coextensive with the larger pipe 12, as shown in Figs. 2 and 4. A spaced series of circulation apertures 14 are formed in the side walls of the lower end portion of the inner pipe 13, whereby water or other cooling medium may be admitted to the upper end of the outer pipe 12 and will flow downward therein along the outer surface of the pipe 13, through the apertures 14 into the pipe 13, and up through the pipe 13 to a discharge outlet (not shown) at the upper end thereof.

As best shown in Figs. 2 and 4, a plug 15 of copper or similar material of high electrical conductivity is connected to the lower end of the cooling and support pipe means. The cylindrical portion 16 of this plug is telescoped within the lower end of the outer pipe 12, and rigidly secured thereto, as by the plug welds 17, located in the spaced apertures 18 in the side walls of the pipe 12, and extended into the aligned, radially disposed sockets 19 in the cylindrical portion of the plug.

The upper end of the cylindrical portion of the plug is provided with a central socket 20, receiving the lower end of the inner pipe 13. Thus the lower ends of both pipes 12 and 13 are closed by the plug 15. The lower portion of the plug 15 is downwardly tapered, forming an inverted, truncated cone as indicated at 21.

An axial socket 22 is formed in the lower end of the inverted, truncated conical portion 21 of the plug, and an internally threaded insert 23, of steel or the like, is secured therein, as by welding shown at 24.

Referring now to the clamping portion of the electrode support structure, this portion of the structure includes generally an engagement member or adaptor indicated generally at 25, and clamping means which may comprise a first or upper clamp means indicated generally at 26, and a second or lower clamp means indicated generally at 27, connected to and spaced downwardly from the clamp means 26.

The engagement member or adaptor 25 is preferably of three dimensional, rectangular, configuration and has the top surface 28, bottom surface 29, and side surfaces 30, 31, 32 and 33. A centrally disposed, downwardly tapered socket 34, conforming to the configuration of the conical lower portion 21 of the plug, extends downwardly into the engagement member 25 from the top surface 28 to a point spaced from the lower surface 29 thereof.

Further, a smaller opening 35 is formed in the lower portion of the engagement member. This opening 35 is axially aligned with the tapered socket 34 and communicates with the lower end thereof, and extends downwardly through the lower surface 29 of the engagement member.

Although the clamp means may be of any conventional type, we have shown the same for purposes of illustration only as of the same construction as in our prior application above referred to.

The clamp means illustrated comprises the first or upper clamp means 26 and the second or lower clamp means 27, connected to and spaced downwardly therefrom. This first clamp means 26 is shown as comprising the generally cylindrical portion 36 having a centrally located opening 37 formed axially therein and extending upwardly from the lower end 38 thereof, forming the clamping ring portion 39.

Further, the cylindrical portion 36 has a diametrically extending slot 40 in the top surface 41 thereof, and is provided with the upwardly and inwardly extending, inverted L-shape arms 42 with the generally horizontal, inwardly disposed upper portions 43. An inverted T-shape slot is thus formed by the L-shape arms 42—43, and the top surface of the first clamp means.

This T-shape slot is of slightly greater height and width than the engagement member 25, whereby the engagement member may be laterally received therein. The clamp means member 26 may be attached to the engagement member 25 by any usual fastening means, such as the series of downwardly extending bolts 44 received through the horizontally extending portions 43 of the arms 42 and through the engagement member 25, and threaded into the insert nuts 45.

For the purpose of detachably connecting the clamp means to the support means, a relatively large fastening screw 46, of stainless steel or the like, is disposed upwardly through the opening 35 in the engagement member 25 and threaded into the steel insert 23 in the plug 21. A washer 47 may surround the screw, between the head 48 thereof and the lower surface 29 of the engagement member.

The head 48 of the fastening screw 46 is received in the lateral groove 40 in the clamp member 36, whereby a suitable tool may be inserted through one end of the groove 40 for engagement with the head 48 of the fastening screw for turning the screw into the insert 23 in order to draw the engagement member 25 and the plug 15 tightly together, or for unscrewing the fastening screw when it is desired to detach the clamp means from the support means.

When the fastening screw 46 is screwed securely into the insert 23, the conical portion 21 of the copper plug 15 will be drawn tightly into the tapered socket 34 in the copper engagement member 25, as best shown in Fig. 2, providing a close contact between the entire conical surface of the plug and the tapered side walls of the socket for transmission of electric current from the tube 12 through the clamp means to the electrode mounted therein.

It will also be obvious that the entire load of the electrode and clamp means is transmitted directly to the supporting pipes. The load is thus carried entirely by the steel fastening screw 46 and steel insert 23, thereby removing all of said load from any connection between members of relatively low strength material of high current conductivity present in the electrode support assembly.

Further, the clamp means may be quickly and easily detached from the support means by the removal of the single fastening screw, without the necessity of disengaging any threaded pipe connections or other fastening means such as is necessary under present practice to detach the clamp means from the support means.

As above mentioned, any conventional type of clamp means may be provided, but for the purpose of illustration the clamp means disclosed in our prior application, above referred to, is shown. For this purpose, a clamping ring 49, of steel or otherwise hardened material, is shown secured in the opening 37 of ring portion 39, as by a series of inserts 50 and clamping screws 51.

Vertically disposed bars 52 have their upper ends located in slots 53 in the member 36, and secured thereto as by screws 54. The second clamp means 27 is secured to the lower ends of the bars 52 as by the studs 55 and welding 56. This second clamp means may be of split ring construction comprising similar segments 57, each of which is secured to one of the bars 52. Lugs 58 are formed upon opposite ends of the segments 57, connecting bolts 59 being located therethrough for clamping the segments together in ring-like formation around the electrode 60. The extreme upper end of the electrode is received within the ring 49 and clamped therein by the clamping screws 51.

With the electrode thus engaged by the clamping means, and the clamping means connected to the support means by the fastening screw 46, as shown in Fig. 2, the electrode may be lowered into an electric arc furnace. Electric current is connected to the upper end of the cooling and supporting pipe 12 (not shown) in conventional manner, and passes down through the pipe 12, plug 15, engagement member or adaptor 25, arms 42—43 into the clamp means 26 and 27 to the electrode. Current is thus conducted readily through the various parts of the electrode support construction as these parts are formed of copper or similar material of high electric conductivity, while at the same time these parts of relatively low strength are relieved of all load which is transmitted solely through the steel fastening screw and insert.

Thus, the electrode support construction comprising the present invention for supporting an electrode in vertical position in an electric arc furnace, overcomes the above-stated difficulties and problems of prior construction and meets the necessary requirements.

The parts may be constructed substantially entirely of relatively low strength material of high electric conductivity, such as copper, and yet will support an electrode of considerable size and weight.

The invention includes a construction in which the cooling pipes form the supporting portion thereof, and the clamping portion is detachably secured thereto by a single fastening screw which transmits the entire load of the electrode directly to the supporting pipes free of any pipe threads or other threaded connections in the low strength parts of the construction, and in which the clamping portion may be secured to the electrode at a point remote from the furnace, the electrode thereafter may be moved to the furnace and quickly and easily attached to the supporting portion of the construction by a single fastening screw. Likewise, the clamping portion may be quickly and readily detached from the supporting portion by merely removing the fastening screw.

The engagement member at all times may remain a part of the clamping portion, being removed as a unit therewith when the fastening screw is removed, as shown in Fig. 4, thus obviating the necessity of disconnecting the clamping member 36 from the engagement member 25.

In the foregoing description, certain terms have been used for brevity, clearness and understanding but no unnecessary limitations are to be implied therefrom, because such words are used for descriptive purposes herein and are intended to be broadly construed.

Moreover, the embodiments of the improved construction illustrated and described herein are by way of example and the scope of the present invention is not limited to the exact details of construction shown.

Having now described the invention, the construction, operation and use of preferred embodiments thereof, and the advantageous new and useful results obtained thereby; the new and useful construction and reasonable mechanical equivalents thereof obvious to those skilled in the art are set forth in the appended claims.

We claim:

1. Electrode support construction for supporting an electrode in vertical position, said electrode support construction comprising a supporting and electric current-carrying member, a contact plug secured to said member and having smooth contact-making side walls, a clamping member having a socket therein conforming to the configuration of said contact plug, a threaded insert in said contact plug, a fastening screw in the clamping member engaging said threaded insert for drawing said contact plug into tight engagement with said socket and transmitting all load carried by the clamping member to the supporting member, and clamp means on the clamping member for clamping an end portion of an electrode.

2. Electrode support construction for supporting an electrode in vertical position, said electrode support construction comprising a supporting and electric current-carrying member, a contact plug secured to said member and having smooth conical contact-making side walls, a clamping member having a conical socket therein conforming to the configuration of said contact plug, a threaded insert in said contact plug, a fastening screw in the clamping member engaging said threaded insert for drawing said contact plug into tight engagement with said socket and transmitting all load carried by the clamping member to the supporting member, and clamp means on the clamping members for clamping an end portion of an electrode.

3. Electrode support construction for supporting an electrode in vertical position, said electrode support construction comprising a supporting and electric current-carrying member, a contact plug secured to said member and having smooth contact-making side walls, a clamping member having a socket therein conforming to the configuration of said contact plug, a threaded insert in said contact plug, a fastening screw in the clamping member engaging said threaded insert for drawing said contact plug into tight engagement with said socket and transmitting all load carried by the clamping member to the supporting member, and clamp means on the clamping member for clamping an end portion of an electrode, said fastening screw and insert forming the sole connection between the supporting member and the clamping member.

4. Electrode support construction for supporting an electrode in vertical position, said electrode support construction comprising a supporting and electric current-carrying member, a contact plug secured to said member and having smooth conical contact-making side walls, a clamping member having a conical socket therein conforming to the configuration of said contact plug, a threaded insert in said contact plug, a fastening screw in the clamping member engaging said threaded insert for drawing said contact plug into tight engagement with said socket and transmitting all load carried by the clamping member to the supporting member, and clamp means on the clamping member for clamping an end portion of an electrode, said fastening screw and insert forming the sole connection between the supporting member and the clamping member.

5. Electrode support construction for supporting an electrode in vertical position, said electrode support construction comprising a supporting and electric current-carrying member, a contact plug secured to said member and having smooth contact-making side walls, a clamping member having a socket therein conforming to the configuration of said contact plug, a threaded insert in said contact plug, a fastening screw in the clamping member engaging said threaded insert for drawing said contact plug into tight engagement with said socket and transmitting all load carried by the clamping member to the supporting member, and clamp means on the clamping member for clamping an end portion of an electrode, said fastening screw and insert being formed of steel and all other parts of said construction being formed of relatively low strength material of high electric conductivity.

6. Electrode support construction for supporting an electrode in vertical position, said electrode support construction comprising a supporting and electric current-carrying member, a contact plug secured to said member and having smooth conical contact-making side walls, a clamping member having a conical socket therein conforming to the configuration of said contact plug, a threaded insert in said contact plug, a fastening screw in the clamping member engaging said threaded insert for drawing said contact plug into tight engagement with said socket and transmitting all load carried by the clamping member to the supporting member, and clamp means on the clamping member for clamping an end portion of an electrode, said fastening screw and insert being formed of steel and all other parts of said construction being formed of relatively low strength material of high electric conductivity.

7. Electrode support construction for supporting an electrode in vertical position, said electrode support construction comprising a supporting and electric current-carrying member, a contact plug secured to said member and having smooth contact-making side walls, a clamping member having a socket therein conforming to the configuration of said contact plug, a threaded insert in said contact plug, a fastening screw in the clamping member engaging said threaded insert for drawing said contact plug into tight engagement with said socket and transmitting all load carried by the clamping member to the supporting member, and clamp means on the clamping member for clamping an end portion of an electrode, said fastening screw and insert being formed of steel and all other parts of said construction being formed of relatively low strength material of high electric conductivity, said fastening screw and insert forming the sole connection between the supporting member and the clamping member.

8. Electrode support construction for supporting an electrode in vertical position, said electrode support construction comprising a supporting and electric current-carrying member, a contact plug secured to said member and having smooth conical contact-making side walls, a clamping member having a conical socket therein conforming to the configuration of said contact plug, a threaded insert in said contact plug, a fastening screw in the clamping member engaging said threaded insert for drawing said contact plug into tight engagement with said socket and transmitting all load carried by the clamping member to the supporting member, and clamp means on the clamping member for clamping an end portion of an electrode, said fastening screw and insert being formed of steel and all other parts of said construction being formed of relatively low strength material of high electric conductivity, said fastening screw and insert forming the sole connection between the supporting member and the clamping member.

9. Electrode support construction for supporting an electrode in vertical position, said electrode support construction comprising a supporting, cooling and electric current-carrying tube means, a contact plug secured to said tube means and having smooth contact-making side walls, a clamping member having a socket therein conforming to the configuration of said contact plug, a threaded insert in said contact plug, a fastening screw in the clamping member engaging said threaded insert for drawing said contact plug into tight engagement with said socket and transmitting all load carried by the clamping member to said tube means, and clamp means on the clamping member for clamping an end portion of an electrode.

10. Electrode support construction for supporting an electrode in vertical position, said electrode support construction comprising a supporting, cooling and electric current-carrying tube means, a contact plug secured to said tube means and having smooth conical contact-making side walls, a clamping member having a conical socket therein conforming to the configuration of said contact plug, a threaded insert in said contact plug, a fastening screw in the clamping member engaging said threaded insert for drawing said contact plug into tight engagement with said socket and transmitting all load carried by the clamping member to said tube means, and clamp means on the clamping member for clamping an end portion of an electrode.

11. Electrode holder construction for supporting an electrode in vertical position including cooling and supporting pipe means, engagement means including plug means, the plug means being telescoped in and plug welded to the pipe means and transmitting the load carried by the engagement means directly to said pipe means, the engagement means also including an engagement member, tapered-wedge-engagement joint means between the engagement member and plug means, the engagement member being provided with transverse shoulder means, a clamping member having a transverse shouldered engagement slot formed therein, the engagement member shoulder being engaged in said shouldered slot, and clamp means on the clamping member for clamping an end portion of an electrode.

References Cited in the file of this patent

UNITED STATES PATENTS

| | | |
|---|---|---|
| 701,218 | Morani | May 27, 1902 |
| 824,153 | Seward | June 26, 1906 |
| 1,735,936 | Sem et al. | Nov. 19, 1929 |

FOREIGN PATENTS

| | | |
|---|---|---|
| 402,712 | France | Sept. 4, 1909 |